3,133,111
PROCESS FOR THE TRANSESTERIFICATION OF ALKOXY-CONTAINING ORGANOSILICON COMPOUNDS
Marshall L. Wheeler, Jr., Marietta, Ohio, assignor to Union Carbide Corporation, a corporation of New York
No Drawing. Filed Apr. 7, 1961, Ser. No. 101,365
13 Claims. (Cl. 260—448.8)

This invention relates to an improved process for the transesterification of alkoxy-containing organosilicon compounds. More particularly it is concerned with an improved catalyst system for promoting the reaction of an alkoxy-containing organosilicon compound with hydroxy-containing organic compounds.

The general transesterification reaction can be depicted by the following general equation:

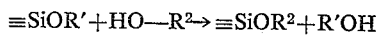

$$\equiv \text{SiOR}' + \text{HO}-\text{R}^2 \rightarrow \equiv \text{SiOR}^2 + \text{R}'\text{OH}$$

where $R'$ is an alkyl group bonded to a silicon atom through oxygen (i.e. $R'$—O is an alkoxy group) and $R^2$ is the organic portion of a mono or polyhydric organic compound. Where a mono-hydric organic compound is employed it is preferred to employ one equivalent of the organic compound for each equivalent of alkoxy groups present in the organosilicon compound. Where a polyhydric organic compound is employed, the amount of such polyhydric organic compound employed will be dependent upon the reaction product desired. For example, if no free hydroxyl groups are desired in the reaction product then one equivalent of the organic compound, based on its hydroxyl content, would be employed for each equivalent of alkoxy groups present in the starting organosilicon compound. Where free hydroxyl groups are desired in the product then more than one equivalent of the polyhydric organic compound (based on hydroxyl content) is employed for each equivalent of alkoxy groups present in the starting organosilicon compound.

It is known that alkoxy-containing organosilicon compounds can be transesterified with a polyhydric alcohol having a higher boiling point than that of the alcohol corresponding to the alcohol derivable from the silicon-bonded alkoxy group. In most instances such transesterification can be accomplished by merely forming an admixture of such alkoxy-containing organosilicon compound and the mono-, or poly-hydric alcohol and heating the mixture to a temperature of from about 100° C. to about 200° C. and removing the lower boiling alcohol derived from the silicon-bonded alkoxy group as a distillate.

Heretofore it has also been known that organosiloxanes containing at least one silicon-bonded alkoxy group can be reacted with a hydroxy end-blocked polyoxyalkylene ether by heating a mixture of such siloxane and ether to a temperature sufficiently elevated to cause them to react to form an alcohol and an organosilicon-polyoxyalkylene block copolymer. Such copolymers and processes for their production are described in U.S. Patents 2,917,480 and 2,834,748. Said patents also disclose that one can employ as a catalyst organic acids such as monochloro acetic acid, perfluoro acetic acid and the like; or alkaline substances such as potassium silanolate.

It is also known that alkyltrialkoxysilanes, wherein the alkyl group contains from 12 to 24 carbon atoms can be reacted with polyethylene glycol to produce the alkyl substituted (tri-hydroxypolyoxyethyleneoxy) silanes.

In carrying out the reactions described in the aforesaid patents, it is known that catalysts are not normally required where the organosilicon starting materials are monomeric or of a low molecular weight e.g. silanes and disiloxanes or the hydroxypolyoxyalkylene starting materials are of a low molecular weight e.g. molecular weights of 200 or less. However, when either or both of the starting materials are polymeric or of high molecular weight, a catalyst has been employed in order to obtain an improvement in the rate at which the reaction proceeds. Both acid and basic catalysts have been employed, although acid catalysts, especially those of the organic acid type have been preferred in those reactions employing an alkoxy polysiloxane starting material. One reason why organic acids are preferred in the latter type of reaction can be attributed to their specificity in aiding the transesterification reaction while at the same time being relatively inert insofar as catalyzing side reactions, such as siloxane bond rearrangement reactions.

It is therefore an object of this invention to provide an improved catalyst system to be employed in the transesterification of alkoxy-containing organosilanes and/or siloxanes with mono-, and polyhydric organic compounds which catalyst system is effective in increasing the reaction rates over the reaction rates wherein the heretofore known organic acid catalysts have been employed.

It has now been found that unexpectedly the rate of transesterification of organic acid catalyzed systems can be greatly increased by adding thereto an amount of a basic material which is less than the amount necessary to neutralize the organic acid.

It has been found that where the basic compound is added to the reaction system, the reaction rates are increased from 2 to 5 times the rate of reaction in an organic acid catalyzed transesterification conducted in the absence of the basic compound.

The improved process of this invention for transesterification of an organosilicon compound containing at least one silicon-bonded alkoxy group with a mono and/or polyhydric organic compound, comprises reacting an admixture of an organosilicon compound having at least one silicon-bonded alkoxy group, a mono-, and/or polyhydric organic compound, an organic acid and a basic compound selected from the class consisting of alkali metal hydroxides of the alkali metals having an atomic number greater than 11, ammonium hydroxide, quaternary alkyl ammonium hydroxides, the nitrogen-containing organic bases and the organic acid salts of said hydroxides and bases, said acid being present in excess of the stoichiometrically equivalent amount of the basic amount present in the reaction mixture.

The organic acids useful as the acid component of the catalyst systems in the process of this invention include for example, the aliphatic acids such as formic, acetic, propionic, butyric, oxalic, malonic and the like and preferably those aliphatic acids containing from 1 to 7 carbon atoms; the chlorinated aliphatic acids, such as mono chloroacetic acid and the like; and the perfluoro aliphatic acids such as perfluoro acetic acid, perfluorobutyric acid, perfluoroglutaric acid and the like. Mixtures of these acids can be used if desired. It is preferred to employ the perfluoro aliphatic acids as a catalyst for this invention. The amount of such acids employed can be from 0.05 to 5.0 percent by weight of the total reactants. Larger amounts of such acids can be employed, however, no commensurate advantage is obtained thereby.

Illustrative of the useful basic components in the catalyst system are the alkali metal hydroxides such as potassium hydroxide, cesium hydroxide, and rubidium hydroxide, and the organic acid salts of such hydroxide; ammonium hydroxide and its organic acid salts. Illustrative of the quaternary alkyl ammonium hydroxides are, for example, tetramethyl ammonium hydroxide, tetra ethyl ammonium hydroxide and the like and their organic acid salts. Illustrative of the nitrogen-containing organic bases are nitrogen compounds containing a trivalent nitrogen atom, for example, the primary, secondary and tertiary organic amine, heterocyclic amines and the like;

preferably such organic amines contain from 1 to 8 carbon atoms. The primary amines include, for example, the monoalkyl amines such as, methylamine, ethylamine, butylamine and the like; and the arylamines such as, phenylamine, benzylamine and the like. The secondary amines include, for example the dialkyl amines such as dimethylamine, diethylamine, dipropylamine and the like; and the diarylamines such as diphenylamine. The trialkylamines include, for example, trimethylamine, triethylamine, tripropylamine, tri-n-butylamine and the like. Such heterocyclic amines include, for example, pyridine, pyrrolidine, morpholine and the like.

Illustrative of the salts which are useful as the basic component in the catalyst system are potassium acetate, cesium acetate, potassium butyrate, potassium perfluoroacetate, ammonium acetate, potassium perfluorobutyrate, tri-n-propylamine acetate, di-n-butylamine acetate, morpholine perfluorobutyrate and the like.

As set forth above the amount of acid catalyst employed in the process of this invention must be greater than stoichiometric amount of the acid required to completley react with the basic material added. It is preferred that the acid be employed in such amounts that the acid is present in at least 0.05 percent by weight of the total reactants.

The amount of basic material added to the reaction system as has been set forth above must be less than the amount required to react with all of the acid catalyst present in the reaction mixture. It has been found that even when such basic material is employed in amounts of 0.02 percent by weight of the total reactants a significant increase in the rate of reaction is effected.

Although the reaction will take place at room temperature it is preferred to heat the reaction mixture to a temperature above the boiling point of the alkanol produced in order to remove the alkanol as by distillation and drive the reaction to completion. Thus preferably the temperature at which the transesterification reaction is conducted is from about 60° C. to about 200° C. or even higher. Preferably the temperature of the reaction is maintained between 100° C. and 200° C. in order to obtain a reasonable rate of reaction. One method of controlling the reaction temperature is to employ a solvent. Ordinarily the reaction is conducted at atmospheric pressure; however, subatmospheric pressures and super atmospheric pressures can be employed, if desired.

Although a solvent is not necessary to the process of this invention, a solvent is sometimes desirable in order to control the temperature of the reaction and prevent undesirable side reactions. In some instances the alkoxy-containing organosilicon compound and the mono- or poly-hydric alkanol are incompatible or differently soluble and a solvent can be employed to bring the reactants into reactive contact. The solvents which can be employed in the process of this invention are those which are non-reactive with the reactants and the products produced. Solvents such as toluene and xylene in which the alkoxy-containing organosilicon compound and the alkanol are soluble are preferred.

Although the use of toluene and xylene as mutual solvents for the reaction mixture of this invention provide a high enough reflux temperature to carry out the condensation reaction to completion, toluene in certain instances, is to be preferred for practical reasons over xylene. It has been found that on infrequent occasions the higher reflux temperature provided by xylene solvent encourages undesirable side reactions producing water instead of the expected alcoholic product. This difficulty has been overcome by the use of toluene as a solvent which provides a lower reflux temperature and, thus, eliminates or lessens the tendency towards side reactions.

When the reaction is complete, it is desirable to remove or neutralize the acid component of the catalyst system in order to make the reaction product stable against hydrolysis. The neutralization of the acid component can be accomplished by adding to the reaction mixture stoichiometric amounts of a weak organic base such as triethanolamine, monoethanolamine, monoisopropanolamine, dibuytlamine etc. or sodium bicarbonate.

When the acid component has been neutralized the solvent, if one has been employed, is removed by distillation and the residue filtered to remove any insoluble material such as the salts.

The organosilicon compounds having at least one silicon-bonded alkoxy group, which can be employed as starting materials in the process of this invention include organosilanes and siloxanes. The organosilanes which can be employed in the process of this invention are those having the formula:

$$R_aSiX_{4-a}$$

where $a$ is an integer having a value of from 1 to 3, inclusive, R is a monovalent hydrocarbon group and X is an alkoxy group.

These organosilanes also include organosilanes of the formula:

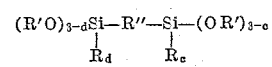

wherein R' is an alkyl group, R'' is a divalent alkylene or arylene group such as ethylene ($—CH_2—CH_2—$), propylene ($—C_3H_6$), butylene ($—C_4H_8—$), phenylene ($—C_6H_4—$), diphenylene ($—C_6H_4—C_7H_4—$), and the like, $c$ is an integer of from 0 to 2 and $d$ is an integer of from 0 to 3.

These organosilanes include, for example, methyltriethoxysilane, phenylmethyldiethoxysilane, dimethyldiethoxysilane, triethylmethoxysilane, di-butyldiethoxysilane, undecyltriethoxysilane, cyclohexenyltriethoxysilane, vinyltriethoxysilane, cyclohexylmethyldiethoxysilane, bis-triethoxysilylethane, bis - triethoxysilylbenzene, bis - ethoxydimethylsilylbenzene, bis-diethoxyphenylsilylethane and the like.

The siloxanes which can be employed as a starting material in the process of this invention contain at least two silicon atoms interconnected through silicon to oxygen to silicon linkage and contain at least one silicon-bonded alkoxy group. These siloxanes containing at least two silicon atoms and at least one silicon-bonded alkoxy group can be broadly depicted as containing units of the formula:

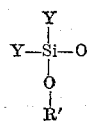

wherein R' is an alkyl group and Y is a monovalent hydrocarbon group as defined for R, an alkoxy group as defined for X or an oxygen atom. These siloxanes can also contain units of the formulas:

$$R_aSiO_{\frac{4-a}{2}}$$

and

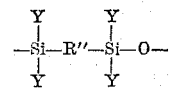

where R, R'', Y and $a$ are as above-defined.

Most suitable as the alkoxy polysiloxane starting materials are those polymers which can be prepared by the process disclosed in U.S.P. 2,909,549. Such polymers are either linear or branch-chained in structure. Such alkoxy polysiloxanes are, for example, ethoxy end-blocked dimethylpolysiloxanes, methoxy end-blocked diphenylsiloxy-dimethylsiloxanes, ethoxy end-blocked phenylmethylpolysiloxanes, propoxy end-blocked diethylpolysiloxanes, ethoxy end-blocked diethysiloxy-methylvinylsiloxy-dimethylsiloxanes and the like. Further illustrations of the alkoxy-containing polysiloxane starting materials are described in U.S. Patents 2,834,748 and 2,917,480.

Illustrative of the monovalent hydrocarbon groups that are represented by R and Y are, for example, aliphatic groups such as methyl, ethyl, vinyl, propyl, isopropyl, the butyls, the pentyls, the hexyls, the cyclohexyls and the like; and aryl groups, such as phenyl, the methylphenyls, the ethylphenyls and the like; and the aralkyls such as benzyl, phenylethyl and the like.

Illustrative of the alkoxy groups that are represented by X and Y are, for example, methoxy, ethoxy, propoxy, butoxy, hexoxy, decoxy and the like. Preferably the alkoxy group contains from 1 to 6 carbon atoms.

Illustrative of the alkyl groups that are represented by R' are, for example, methyl, ethyl, butyl, propyl, hexyl, decyl and the like; preferably such alkoxy groups contain from 1 to 6 carbon atoms.

Illustrative of the organic portions of mono- or polyhydric organic compounds which $R^2$ represents are, for example alkyl groups such as ethyl, propyl, butyl, undecyl and the like; aralkyl groups such as benzyl, phenylethyl and the like; aryl groups such as phenyl, tolyl and the like; alkoxy polyoxyalkylene groups such as $$CH_3O(C_2H_4O)_6—C_2H_4—, \quad C_3H_7O(C_3H_6O)_{10}C_3H_6—$$

$C_4H_9O(C_3H_6O)_{10}—$, $(C_2H_4O_5—C_2H_4—$, and the like; hydroxyalkyl groups such as hydroxyethyl, hydroxypropyl, hydroxybutyl, hydroxundecyl and the like; hydroxyaryl groups such as hydroxyphenyl, hydroxytolyl and the like; hydroxypolyoxyalkylene groups, such as $$HO(C_2H_4O)_{10}—C_2H_4—, \quad HO(C_3H_6O)_5C_3H_6—,$$

$HO(C_3H_6O)_{10}(C_2H_4O)_5C_2H_4—$, and the like; and polyhydroxyalkyl groups produced by removing a single hydroxy group from tri, tetra, penta or hexahydroxy aliphatic alcohols such as glycerol and the glycerol started polyoxyalkylene ethers.

The mono and polyhydric organic compounds which are useful in the process of this invention include the alcohols such as ethanol, butanol, propanol, ethylene glycol, glycerine, benzyl alcohol and the like; the phenols, the polyhydric phenols and the like; and the hydroxy-containing polyoxyalkylene ethers such as $HOC_2H_4OCH_3$, $$HO(C_2H_4O)_2C_3H_7$$

and higher polymers. It is preferred to employ the polyoxyalkylene ether polymers which contain at least 5 oxyalkylene units and at least one carbon-bonded hydroxyl group. These preferred polyoxyalkylene ether polymers can contain one, two, three or more carbon-bonded hydroxyl groups.

Such polyoxyalkylene-ethers can be represented by the general formula:

$$HO(C_nH_{2n}O)_xR''$$

wherein R'' is hydrogen or a monovalent hydrocarbon radical, $n$ is an integer of from 2 to 4 and $x$ is an integer of at least 5. Thus, a polyoxyalkylene block of five units in which $n$ is 2 throughout the chain or block has a molecular weight of 220 which is the minimum molecular weight attributable to the block. Organic blocks of a molecular weight up to about 10,000 or higher can be used. A molecular weight from about 500 to 6000 is preferred, however. The oxyalkylene group need not be the same throughout the organic chain or block which can comprise oxyalkylene groups of differing molecular weights such as oxyethylene; oxy-1,2-propylene; oxy-1,3-propylene and the oxybutylenes.

Monohydroxypolyoxypropylene monoethers suitable for the practice of the invention are described in Fife and Roberts U.S. Patent No. 2,448,664.

Also, monohydroxyoxyethylene-oxy - 1,2 - propylene monoethers having both oxyethylene and oxypropylene groups in the molecule are described in Roberts and Fife U.S. Patent No. 2,425,755. In addition, polyoxyalkylene monoethers containing both oxyethylene and oxypropylene groups in the molecule may be formed by the sequential addition of ethylene oxide and propylene oxide to a monohydric alcohol to form oxyalkylene chains composed of a sequence of oxyethylene groups followed by a sequence of oxypropylene groups or vice versa.

The polyoxyalkylene diols employed in forming block copolymers are the well known polyoxyethylene glycols, polyoxypropylene glycols and polyoxybutylene glycols as well as the polyoxyethylene-polyoxypropylene diols described in Toussaint and Fife U.S. Patent No. 2,425,845. Other oxalkylene diols may be formed by the addition of ethylene oxide to polyoxypropylene glycol or of propylene oxide to polyoxyethylene glycols.

It is also well known that polyoxyalkylene mono-ol polymers can be made by reacting alkylene oxides with other compounds having a labile hydrogen atom. Examples of such compounds are alkyl and aryl mercaptans, such as ethyl and butyl mercaptans and alkyl and aryl amines, such as monobutyl and dibutylamine and aniline.

Illustrative of the organosilicon compounds which can be produced by the process of this invention are the organosilanes of the formulas:

$$R_aSi(OR^2)_{4-a}$$

and

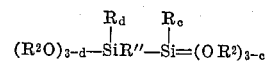

wherein R, $R^2$, R'', $a$, $c$ and $d$ are as above-defined.

The organosilicon compounds produced by the process of this invention also include organosilanes of the formula:

$$R_aSi(O—Z—O)_{4-a}SiR_a$$

wherein R and $a$ are as above-defined and Z is a divalent hydrocarbon radical, such as ethylene, propylene, phenylene and the like or divalent polyoxyalkylene such as $$(—C_3H_7O)_yC_3H_6—$$

$$(—C_2H_4O)_y(C_3H_7O)_zC_3H_7—$$

and the like where $y$ and $z$ are integers of at least 1.

The organosilicon compounds which can be produced by the process of this invention also include organopolysiloxanes containing at least two silicon atoms interconnected through silicon to oxygen to silicon linkage and containing at least one silicon-bonded $OR^2$ group. These organopolysiloxanes can be broadly depicted as containing units of the formula:

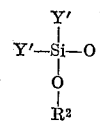

wherein Y' is an $OR^2$ group, a monovalent hydrocarbon radical as defined for Y or oxygen. These organopolysiloxanes can also contain units of the formulas:

$$R_aSiO_{\frac{4-a}{2}}$$

and

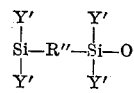

wherein R, R'', Y' and $a$ are as above-defined.

The organopolysiloxanes produced by the process of this invention also include polysiloxanes containing units of the formula:

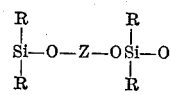

in addition to one or more units of the formula $$R_aSiO_{\frac{4-a}{2}}$$

where R, Z and $a$ are as above-defined. Illustrative examples of the organopolysiloxanes which can be produced by the process of this invention are disclosed in U.S. Patents 2,834,748 and 2,917,480.

The compounds produced by the improved process of this invention have known utility. For example the silanes are useful as intermediates in the production of organopolysiloxane resins. The polysiloxanes are useful as lubricants, as mold-release agents and the like.

The following examples serve to illustrate the invention. In the examples all parts are by weight unless otherwise specified.

EXAMPLE 1

A glass reaction vessel fitted with a distillation column and still head, an agitator and thermometer was charged with toluene (274 ml.) and a monohydroxy polyoxyalkylene ether having the average formula $$HO(C_3H_6O)_{14}(C_2H_4O)_{18}C_4H_9$$

(400 grams, viscosity 249 centistokes at 25° C.). The solution was heated to about 125° C. and a small amount of contained water in the ether was removed as a toluene-water azeotrope. Trifluoroacetic acid (1.23 grams, 0.01 mole), potassium hydroxide (0.24 gram, 0.004 mole) and an ethoxy end-blocked dimethylsiloxane fluid having the average formula $$[C_2H_5SiO_3][(CH_3)_2SiO]_{18}[C_2H_5]_3$$

and a viscosity of from 14 to 16 centistokes at 25° C. (123 grams) were added to the solution in the reaction vessel and the resulting mixture heated to reflux (about 120 to 135° C.). Ethanol began to evolve almost immediately. The ethanol was concentrated in the still head and was distilled as a toluene-ethanol azeotrope. The mixture was at first hazy due to the insolubility of the polysiloxane fluid in the toluene-polyoxyalkylene ether mixture. The reaction was complete in one hour as indicated by the fact that no more ethanol was being evolved, the reaction mixture had become clear and foam appeared on the surface of the liquid. The reaction mixture was then neutralized with sodium bicarbonate and the toluene was removed by distillation at atmospheric pressure. The residue was then filtered to remove the salts. The filtered liquid residue was identified as a dimethylsiloxane polyoxyalkylene ether block copolymer having a viscosity of 1000 centistokes at 25° C. and having an average formula of $$[C_2H_5SiO_3][(CH_3)_2SiO]_{18}[(C_3H_6O)_{14}(C_2H_4O)_{18}C_4H_9]_3$$

EXAMPLE 2

A glass reaction vessel fitted with a distillation column and still head, an agitator and thermometer was charged with toluene (250 grams) and a monohydroxy polyoxyalkylene ether having the average formula $$HO(C_3H_6O)_{14}(C_2H_4O)_{18}C_4H_9$$

(400 grams, viscosity 256 centistokes at 25° C.). The solution was heated to about 125° C. and a small amount of contained water in the ether was removed as a toluene-water azeotrope. Trifluoroacetic acid (1.5 gram, 0.013 mole), and an ethoxy end-blocked dimethylsiloxane fluid having the average formula $$[CH_3SiO_3][(CH_3)_2SiO]_{18}[C_2H_5]_3$$

and a viscosity of from 19.7 centistokes at 25° C. (128 grams) were added to the solution in the reaction vessel and the resulting mixture heated to reflux (about 120 to 135° C.) for 32 hours. The reaction mixture was still hazy indicating that there was incomplete reaction. An additional amount of trifluoroacetic acid (0.5 grams, .004 mole) was added together with potassium acetate (0.3 gram, 0.003 mole) to the mixture. Ethanol was evolved and was concentrated in the still head and was distilled as a toluene-ethanol azeotrope. The mixture was at first hazy due to the insolubility of the polysiloxane fluid in the toluene-polyoxyalkylene ether mixture. The reaction was complete in one hour as indicated by the fact that no more ethanol was being evolved, the reaction mixture had become clear and foam appeared on the surface of the liquid. The reaction mixture was then neutralized with sodium bicarbonate and the toluene was removed by distillation at atmospheric pressure. The residue was then filtered to remove the salts. The filtered liquid residue was identified as a dimethylsiloxane polyoxyalkylene ether block copolymer having a viscosity of 1090 centistokes at 25° C. and having an average formula of $$[CH_3SiO_3][(CH_3)_2SiO]_{18}[(C_3H_6O)_{14}(C_2H_4O)_{18}C_4H_9]_3$$

EXAMPLE 3

A glass reaction vessel fitted with a distillation column and still head, an agitator and thermometer was charged with toluene (268 grams) and a monohydroxy polyoxyalkylene ether having the average formula $$HO(C_3O)_{14}(C_2H_4O)_{18}C_4H_9$$

(400 grams, viscosity 249 centistokes at 25° C.). The solution was heated to about 125° C. and a small amount of contained water in the ether was removed as a toluene-water azeotrope. Trifluoroacetic acid (0.4 gram, .0035 mole), potassium hydroxide (0.24 gram, 0.004 mole) and an ethoxy end-blocked dimethylsiloxane fluid having the average formula $$[C_2H_5SiO_3][(CH_3)_2SiO]_{18}[C_2H_5]_3$$

and a viscosity of from 14 to 16 centistokes at 25° C. (122 grams) were added to the solution in the reaction vessel and the resulting mixture heated to reflux (about 120 to 135° C.). After one hour reflux, there was an insignificant amount of ethanol evolved. At this point an additional 0.5 gram of trifluoroacetic acid was added. The rate of evolution of ethanol was increased. The ethanol was concentrated in the still head and was distilled as a toluene-ethanol azeotrope. The mixture was at first hazy due to the insolubility of the polysiloxane fluid in the toluene-polyoxyalkylene ether mixture. The reaction was complete within two hours as indicated by the fact that no more ethanol was being evolved, the reaction mixture had become clear and foam appeared on the surface of the liquid. The reaction mixture was then neutralized with sodium bicarbonate and the toluene was removed by atmospheric pressure distillation. The residue was then filtered to remove the salts. The filtered liquid residue was identified as a dimethylsiloxane polyoxyalkylene ether block copolymer having an average formula of $$[CH_3SiO_3][(CH_3)_2SiO]_{18}[(C_3H_6O)_{14}(C_2H_4O)_{18}C_4H_9]_3$$

EXAMPLE 4

A glass reaction vessel fitted with a distillation column and still head, an agitator and thermometer was charged with toluene (200 grams) and a monohydroxy polyoxyalkylene ether having the average formula $$HO(C_3H_6O)_{14}(C_2H_4O)_{18}C_4H_9$$

(400 grams, viscosity 249 centistokes at 25° C.). The solution was heated to about 125° C. and a small amount of contained water in the ether was removed as a toluene-water azeotrope. Trifluoroacetic acid (2.5 grams, 0.022 mole), triethylamine (1.3 gram, 0.013 mole) and an ethoxy end-blocked dimethylsiloxane fluid having the average formula $$[CH_3SiO_3][(CH_3)_2SiO]_{18}[C_2H_5]_3$$

and a viscosity of from 14 to 16 centistokes at 25° C. (123 grams) were added to the solution in the reaction vessel and the resulting mixture heated to reflux (about 120 to 135° C.). Ethanol began to evolve almost immediately. The ethanol was concentrated in the still head and was distilled as a toluene-ethanol azeotrope. The mixture was at first hazy due to the insolubility of the polysiloxane fluid in the toluene-polyoxyalkylene ether mixture. The reaction was complete in one hour as indicated by the fact that no more ethanol was being evolved, the reaction mixture had become clear and foam appeared on the surface of the liquid. The reaction mixture was then neutralized with sodium bicarbonate and the toluene was removed by distillation at atmospheric pressure. The residue was then filtered to remove the salts. The filtered liquid residue was identified as a dimethylsiloxane polyoxyalkylene ether block copolymer having a viscosity of 638 centistokes at 25° C. and having an average formula of $$[CH_3SiO_3][(CH_3)_2SiO]_{18}[(C_3H_6O)_{14}(C_2H_4O)_{18}C_4H_9]_3$$

EXAMPLE 5

A glass reaction vessel fitted with a distillation column and still head, an agitator and thermometer was charged with toluene (250 grams) and a monohydroxy polyoxyalkylene ether having the average formula $$HO(C_3H_6O)_{14}(C_2H_4O)_{18}C_4H_9$$

(400 grams, viscosity 249 centistokes at 25° C.). The solution was heated to about 125° C. and a small amount of contained water in the ether was removed as a toluene-water azeotrope. Trifluoroacetic acid (2.20 grams, 0.019 mole), triethylamine (0.5 gram, .005 mole) and an ethoxy end-blocked dimethylsiloxane fluid having the average formula $$[CH_3SiO_3][(CH_3)_2SiO]_{18}[C_2H_5]_3$$

and a viscosity of 16 centistokes at 25° C. (124 grams) were added to the solution in the reaction vessel and the resulting mixture heated to reflux (about 120 to 135° C.). Ethanol began to evolve almost immediately. The ethanol was concentrated in the still head and was distilled as a toluene-ethanol azeotrope. The mixture was at first hazy due to the insolubility of the polysiloxane fluid in the toluene-polyoxyalkylene ether mixture. The reaction was complete in four hours as indicated by the fact that no more ethanol was being evolved, the reaction mixture became clear and foam appeared on the surface of the liquid. The reaction mixture was then neutralized with sodium bicarbonate and the toluene was removed by distillation at atmospheric pressure. The residue was then filtered to remove the salts. The filtered liquid residue was identified as a dimethylsiloxane polyoxyalkylene ether block copolymer having an average formula of $$[CH_3SiO_3][(CH_3)_2SiO]_{18}[(C_3H_6O)_{14}(C_2H_4O)_{18}C_4H_9]_3$$

EXAMPLE 6

A glass reaction vessel fitted with a distillation column and still head, an agitator and thermometer was charged with toluene (250 grams) and a monohydroxy polyoxyalkylene ether having the average formula $$HO(C_3H_6O)_{14}(C_2H_4O)_{18}C_4H_9$$

(400 grams, viscosity 249 centistokes at 25° C.). The solution was heated to about 125° C. and a small amount of contained water in the ether was removed as a toluene-water azeotrope. Trifluoroacetic acid (2.05 grams, 0.018 mole), diethylamine (0.5 gram, 0.007 mole) and an ethoxy end-blocked dimethylsiloxane fluid having the average formula $$[CH_3SiO_3][(CH_3)_2SiO]_{18}[C_2H_5]_3$$

and a viscosity of 16 centistokes at 25° C. (124 grams) were added to the solution in the reaction vessel and the resulting mixture heated to reflux (about 120 to 135° C.). Ethanol began to evolve almost immediately. The ethanol was concentrated in the still head and was distilled as a toluene-ethanol azeotrope. The mixture was at first hazy due to the insolubility of the polysiloxane fluid in the toluene-polyoxyalkylene ether mixture. The reaction was complete in one hour as indicated by the fact that no more ethanol was being evolved, the reaction mixture had become clear and foam appeared on the surface of the liquid. The reaction mixture was then neutralized with sodium bicarbonate and the toluene was removed by distillation at atmospheric pressure. The residue was then filtered to remove the salts. The filtered liquid residue was identified as a dimethylsiloxane polyoxyalkylene ether block copolymer having an average formula of $$[CH_3SiO_3][(CH_3)_2SiO]_{18}[(C_3H_6O)_{14}(C_2H_4O)_{18}C_4H_9]_3$$

EXAMPLE 7

A glass reaction vessel fitted with a distillation column and still head, an agitator and thermometer was charged with toluene (250 grams) and a mixture of monohydroxy polyoxyalkylene ethers having the average formulas $HO(C_3H_6O)_{14}(C_2H_4O)_{18}C_4H_9$ (87.5 percent by weight) and $HO(C_3H_6O)_{25.1}(C_2H_4O)_{33.25}C_4H_9$ (12.5 percent by weight) (400 grams, viscosity about 275 centistokes at 25° C.). The solution was heated to about 125° C. and a small amount of contained water in the ether was removed as a toluene-water azeotrope. Trifluoroacetic acid (1.5 gram, 0.013 mole), tetramethyl ammonium hydroxide pentahydrate (0.36 gram, 0.002 mole) and an ethoxy end-blocked dimethylsiloxane fluid having the average formula $$[CH_3SiO_3][(CH_3)_2SiO]_{18}[C_2H_5]_3$$

and a viscosity of 19.7 centistokes at 25° C. (132 grams) were added to the solution in the reaction vessel and the resulting mixture heated to reflux (about 120 to 135° C.). Ethanol began to evolve almost immediately. The ethanol was concentrated in the still head and was distilled as a toluene-ethanol azeotrope. The mixture was at first hazy due to the insolubility of the polysiloxane fluid in the toluene-polyoxyalkylene ether mixture. The reaction was complete in one hour as indicated by the fact that no more ethanol was being evolved, the reaction mixture had become clear and foam appeared on the surface of the liquid. The reaction mixture was then neutralized with sodium bicarbonate and the toluene was removed by distillation at atmospheric pressure. The residue was then filtered to remove the salts. The filtered liquid residue was identified as a dimethylsiloxane polyoxyalkylene ether block copolymer having a viscosity of 1595 centistokes at 25° C. and having a siloxane portion of the average formula $$[C_2H_5SiO_3][(CH_3)_2SiO]_{18}$$

which has interconnected thereto by a C—O—Si linkage, three polyoxyalkylene groups of the average formula $$-(C_3H_6O)_{14}(C_2H_4O)_{18}C_4H_9$$

and $$(C_3H_6O)_{25.1}(C_2H_4O)_{33.25}C_4H_9$$

*Control 1*

A glass reaction vessel fitted with a distillation column and still head, an agitator and thermometer was charged with toluene (250 grams) and a monohydroxy polyoxyalkylene ether having the average formula $$HO(C_3H_6O)_{14}(C_2H_4O)_{18}C_4H_9$$

(400 grams viscosity 249 centistokes at 25° C.). The solution was heated to about 125° C. and a small amount of contained water in the ether was removed as a toluene-water azeotrope. Trifluoroacetic acid (1.1 gram, 0.01 mole), sodium acetate (0.5 gram, 0.006 mole) and an ethoxy end-blocked dimethylsiloxane fluid having the average formula $$[CH_3SiO_3][(CH_3)_2SiO]_{18}[C_2H_5]_3$$

and a viscosity of 16 centistokes at 25° C. (115 grams) were added to the solution in the reaction vessel and the resulting mixture heated to reflux (about 120 to 135° C.). There was no significant reaction after refluxing the mixture for one hour.

*Control 2*

A glass reaction vessel fitted with a distillation column and still head, an agitator and thermometer was charged with toluene (220 grams) and a monohydroxy polyoxyalkylene ether having the average formula

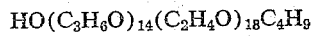
HO(C$_3$H$_6$O)$_{14}$(C$_2$H$_4$O)$_{18}$C$_4$H$_9$ (400 grams, viscosity 249 centistokes at 25° C.). The solution was heated about 125° C. and a small amount of contained water in the ether was removed as a toluene-water azeotrope. Trifluoroacetic acid (0.88 gram, 0.007 mole), and an ethoxy end-blocked dimethylsiloxane fluid having the average formula

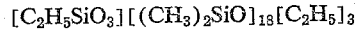
[C$_2$H$_5$SiO$_3$][(CH$_3$)$_2$SiO]$_{18}$[C$_2$H$_5$]$_3$ and a viscosity of from 14 to 16 centistokes at 25° C. (123 grams) were added to the solution in the reaction vessel and the resulting mixture heated to reflux (about 120 to 135° C.) for five and one half hours. The reaction mixture remained hazy due to the insolubility of the polysiloxane fluid in the toluene-polyoxyalkylene ether mixture and indicated that little or no reaction was taking place. The reaction mixture was neutralized with sodium bicarbonate and the toluene was removed by distillation at atmospheric pressure. The residue was then filtered to remove the salts. The filtered residue was hazy indicating that the reaction had not gone to completion.

What is claimed is:

1. An improved process for the transesterification of an alkoxy-containing organosilicon compound with a hydroxy-containing organic compound which comprises reacting an organosilicon compound containing at least one alkoxy group attached to silicon and a hydroxy-containing organic compound selected from the class consisting of monohydric aliphatic hydrocarbon alcohols, glycols, phenols and hydroxy-containing polyoxyalkylene ethers in contact with an organic acid selected from the class consisting of aliphatic acids, chlorinated aliphatic acids and perfluoro aliphatic acids and a basic compound selected from the class consisting of the alkali metal hydroxides of the alkali metals having an atomic number greater than 11 and the organic acid salts thereof, ammonium hydroxide and the organic acid salts thereof, the quaternary alkyl ammonium hydroxides and the organic acid salts thereof, the nitrogen-containing organic bases containing a trivalent nitrogen atom and the organic acid salts thereof, said organic acid being present in excess of the stoichiometrically equivalent amount necessary for complete reaction with said base.

2. An improved process for the transesterification of an alkoxy-containing organosilicon compound with a hydroxy-containing organic compound which comprises reacting an organosilicon compound containing at least one alkoxy group attached to silicon and a hydroxy-containing organic compound selected from the class consisting of monohydric aliphatic hydrocarbon alcohols, glycols, phenols and hydroxy-containing polyoxyalkylene ethers, said hydroxy-containing organic compound having a higher boiling point than the alkanol corresponding to the alkoxy group of the organosilicon compound, in contact with an organic acid selected from the class consisting of aliphatic acids, chlorinated aliphatic acids and perfluoro aliphatic acids and a basic compound selected from the class consisting of the alkali metal hydroxides of the alkali metals having an atomic number greater than 11 and the organic acid salts thereof, ammonium hydroxide and the organic acid salts thereof, the quaternary alkyl ammonium hydroxides and the organic acid salts thereof, the nitrogen-containing organic bases containing a trivalent nitrogen atom and the organic acid salts thereof, said organic acid being present in excess of the stoichiometrically equivalent amount necessary for complete reaction with said base, and removing an alkanol corresponding to the alkoxy groups of the organo-silicon compound from the reaction mixture.

3. An improved process for the transesterification of an alkoxy-containing organosilicon compound with a hydroxy-containing organic compound which comprises reacting an organo-silicon compound containing at least one alkoxy group attached to silicon and a hydroxy-containing organic compound selected from the class consisting of monohydric aliphatic hydrocarbon alcohols, glycols, phenols and hydroxy-containing polyoxyalkylene ethers in contact with a perfluoro aliphatic acid and a basic compound selected from the class consisting of the alkali metal hydroxides of the alkali metals having an atomic number greater than 11 and the organic acid salts thereof, ammonium hydroxide and the organic acid salts thereof, the quaternary alkyl ammonium hydroxides and the organic acid salts thereof, the nitrogen-containing organic bases containing a trivalent nitrogen atom and the organic acid salts thereof, said perfluoro organic acid being present in excess of the stoichiometrically equivalent amount necessary for complete reaction with said base, and removing an alkanol corresponding to the alkoxy group of the organosilicon compound from the reaction mixture.

4. An improved process for the transesterification of an alkoxy-containing organosilicon compound with a hydroxy-containing organic compound which comprises reacting an organosilicon compound containing at least one alkoxy group attached to silicon and a hydroxy-containing organic compound selected from the class consisting of monohydric, aliphatic hydrocarbon alcohols, glycols, phenols and hydroxy-containing polyoxyalkylene ethers in contact with perfluoroacetic acid and a basic compound selected from the class consisting of the alkali metal hydroxides of the alkali metals having an atomic number greater than 11 and the organic acid salts thereof, ammonium hydroxide and the organic acid salts thereof, the quaternary alkyl ammonium hydroxides and the organic acid salts thereof, the nitrogen-containing organic bases containing a trivalent nitrogen atom and the organic acid salts thereof, said perfluoroacetic acid being present in excess of the stoichiometrically equivalent amount necessary for complete reaction with said base, and removing an alkanol corresponding to the alkoxy group of the organosilicon compound from the reaction mixture.

5. An improved process for the transesterification of an alkoxy-containing organosilicon compound with a hydroxy-containing organic compound which comprises reacting an organosiloxane containing at least one alkoxy group attached to silicon and a hydroxy-containing organic compound selected from the class consisting of monohydric aliphatic hydrocarbon alcohols, glycols, phenols and hydroxy-containing polyoxyalkylene ethers in contact with an organic acid selected from the class consisting of aliphatic acids, chlorinated aliphatic acids and perfluoro aliphatic acids and a basic compound selected from the class consisting of the alkali metal hydroxides of the alkali metals having an atomic number greater than 11 and the organic acid salts thereof, ammonium hydroxide and the organic acid salts thereof, the quaternary alkyl ammonium hydroxides and the organic acid salts thereof, the nitrogen-containing organic bases containing a trivalent nitrogen atom and the organic acid salts thereof, said organic acid being present in excess of the stoichiometrically equivalent amount necessary for complete reaction with said base, and removing an alkanol corresponding to the alkoxy group of the organosilicon compound from the reaction mixture.

6. An improved process for the transesterification of an alkoxy-containing organosilicon compound with a hydroxy-containing organic compound which comprises reacting an organosiloxane containing at least one alkoxy group attached to silicon and a hydroxy-containing polyoxyalkylene ether composed of at least five oxyalkylene groups in contact with an organic acid selected from the class consisting of aliphatic acids, chlorinated aliphatic acids and perfluoro aliphatic acids and a basic compound selected from the class consisting of the alkali metal hydroxides of the alkali metals having an atomic number greater than 11 and the organic acid salts thereof, ammonium hydroxide and the organic acid salts thereof, the quaternary alkyl ammonium hydroxides and the organic acid salts thereof, the nitrogen-containing organic bases containing a trivalent nitrogen atom and the organic acid salts thereof, said organic acid being present in excess of the stoichiometrically equivalent amount necessary for complete reaction with said base, and removing an alkanol corresponding to the alkoxy group of the organosilicon compound from the reaction mixture.

7. An improved process for the transesterification of an alkoxy-containing organosilicon compound with a hydroxy-containing organic compound which comprises reacting an organosiloxane containing at least one alkoxy group attached to silicon and a hydroxy-containing polyoxyalkylene ether composed of at least five oxyalkylene groups in contact with a perfluoroaliphatic acid and a basic compound selected from the class consisting of the alkali metal hydroxides of the alkali metals having an atomic number greater than 11 and the organic acid salts thereof, ammonium hydroxide and the organic acid salts thereof, the quaternary alkyl ammonium hydroxides and the organic acid salts thereof, the nitrogen-containing organic bases containing a trivalent nitrogen atom and the organic acid salts thereof, said perfluoro-organic acid being present in excess of the stoichiometrically equivalent amount necessary for complete reaction with said base, and removing an alkanol corresponding to the alkoxy group of the organosilicon compound from the reaction mixture.

8. An improved process for the transesterification of an alkoxy-containing organosilicon compound with a hydroxy-containing organic compound which comprises reacting an organosiloxane containing at least one alkoxy group attached to silicon and a hydroxy-containing polyoxyalkylene ether composed of at least five oxyalkylene groups in contact with perfluoroacetic acid and a basic compound selected from the class consisting of the alkali metal hydroxides of the alkali metals having an atomic number greater than 11 and the organic acid salts thereof, ammonium hydroxide and the organic acid salts thereof, the quaternary alkyl ammonium hydroxides and the organic acid salts thereof, the nitrogen-containing organic bases containing a trivalent nitrogen atom and the organic acid salts thereof, said perfluoroacetic acid being present in excess of the stoichiometrically equivalent amount necessary for complete reaction with said base, and removing an alkanol corresponding to the alkoxy group of the organosilicon compound from the reaction mixture.

9. The process as claimed in claim 8 wherein the basic compound is potassium hydroxide.

10. The process as claimed in claim 8 wherein the basic compound is potassium acetate.

11. The process as claimed in claim 8 wherein the basic compound is triethyl amine.

12. The process as claimed in claim 8 wherein the basic compound is diethylamine.

13. The process as claimed in claim 8 wherein the basic compound is tetramethyl ammonium hydroxide.

References Cited in the file of this patent
UNITED STATES PATENTS

| | | |
|---|---|---|
| 2,811,542 | Speier et al. | Oct. 29, 1957 |
| 2,834,748 | Bailey et al. | May 13, 1958 |
| 2,851,474 | Pines et al. | Sept. 9, 1958 |
| 2,917,480 | Bailey et al. | Dec. 15, 1959 |
| 2,928,857 | Holt et al. | Mar. 15, 1960 |